United States Patent [19]
Lesure

[11] 3,947,970
[45] Apr. 6, 1976

[54] ROLL ALIGNMENT GAUGE
[75] Inventor: John B. Lesure, Appleton, Wis.
[73] Assignee: Appleton Mills, Appleton, Wis.
[22] Filed: Sept. 19, 1974
[21] Appl. No.: 507,266

[52] U.S. Cl. .................. 33/182; 33/349; 33/375; 33/387; 33/388
[51] Int. Cl.² ............................................ G01C 9/28
[58] Field of Search .......... 33/174 S, 182, 384, 385, 33/387, 388, 349, 365, 371, 374, 375, 376

[56] References Cited
UNITED STATES PATENTS

| | | | |
|---|---|---|---|
| 1,410,491 | 3/1922 | Matoba | 33/375 |
| 1,459,381 | 6/1923 | Von Serkey | 33/375 |
| 1,683,509 | 9/1928 | Wescott | 33/385 |

FOREIGN PATENTS OR APPLICATIONS

| | | | |
|---|---|---|---|
| 157,078 | 11/1932 | Switzerland | 33/385 |
| 823,134 | 10/1951 | Germany | 33/182 |

*Primary Examiner*—Houston S. Bell, Jr.
*Assistant Examiner*—Steven L. Stephan
*Attorney, Agent, or Firm*—Andrus, Sceales, Starke & Sawall

[57] ABSTRACT

An alignment gauge for use in determining whether two elongated members, such as cylindrical rolls, are in parallel relationship. The gauge includes a rod or standard, and a pad is connected to a micrometer and is mounted for lateral movement with respect to the rod. A level having a bubble-containing vial is mounted for pivotal movement with respect to the rod. In operation, the rod is placed tangentially against one of two generally parallel rolls and the pad is placed tangentially against the other of the rolls. The level is then pivoted until the vial is horizontal. The gauge is then positioned in the same manner at the opposite ends of the rolls and the micrometer is adjusted until the vial is horizontal or level. The reading of the micrometer is an indication of the misalignment of the two rolls.

3 Claims, 5 Drawing Figures

U.S. Patent April 6, 1976     3,947,970
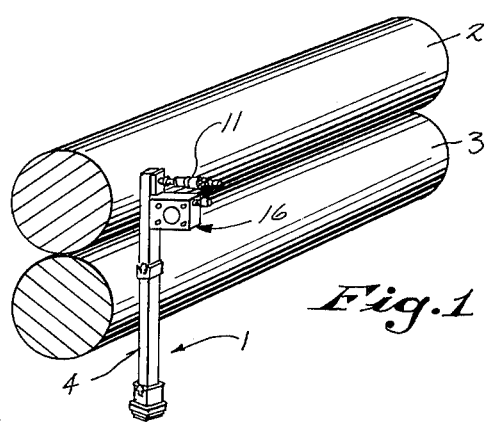
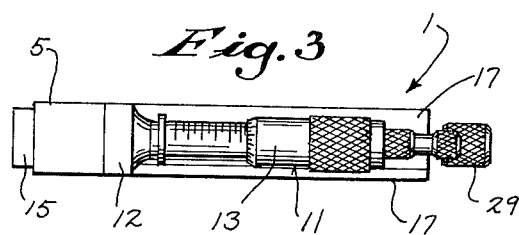
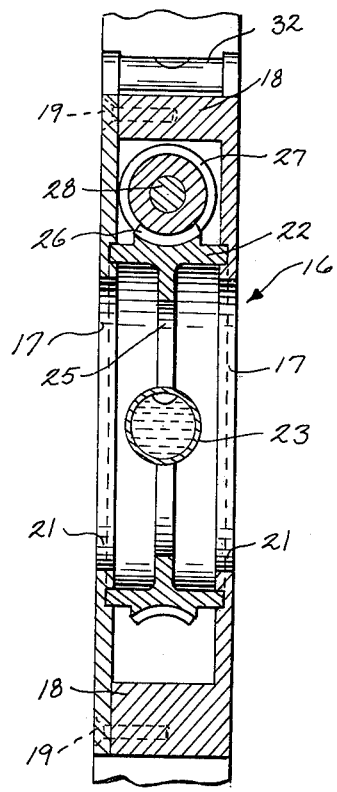
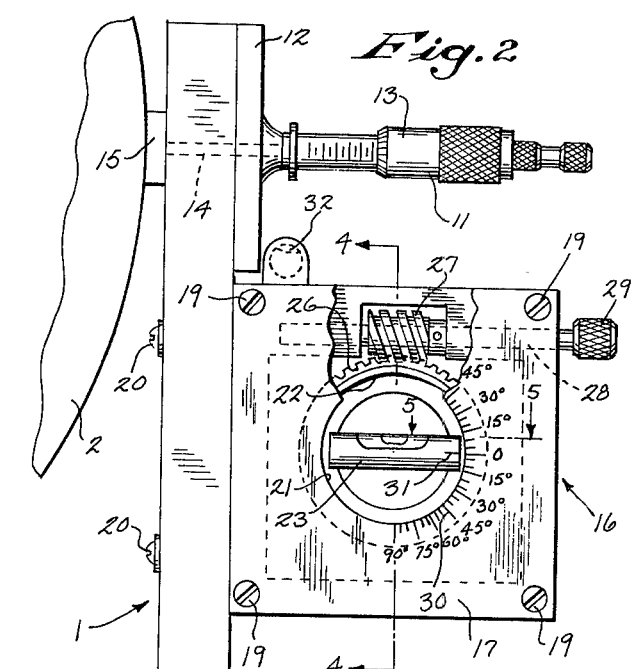
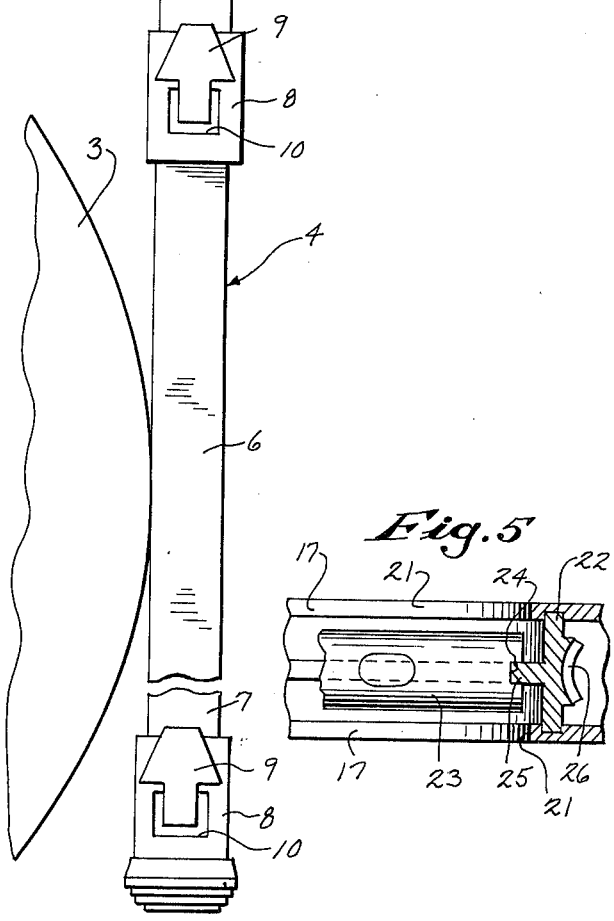

ROLL ALIGNMENT GAUGE

BACKGROUND OF THE INVENTION

In a papermaking machine it is necessary that the rolls be in axial alignment. For example, in the press section of the papermaking machine, the paper web is supported on a felt and passes between press rolls which serve to extract water from the paper web. If the rolls carrying the felt are not in precise axial alignment, the felt will tend to fold over, forming machine direction folds or creases in the felt. If the folds pass through the nip between the heavily loaded press rolls, the felt will be crushed and the paper web will be creased. Similarly, if the rolls in the forming section and dryer section of the papermaking machine are not aligned, the fabric will tend to wrinkle or fold with the result that the paper web will be correspondingly wrinkled or deformed.

In the past, various methods have been employed to maintain alignment of the rolls in the papermaking machine and one method of alignment has been to drop a plumb line at each end of the pair of rolls and any misalignment of the rolls can be visually ascertained.

However, the plumb line method is relatively inaccurate and does not provide a positive numerical indication of the degree of misalignment. Furthermore, after adjustment of a roll, it is necessary to re-check the alignment and again readjust the roll if necessary. Thus, the procedure is, in effect, a trial and error system.

The alignment of the rolls has also been determined by measuring the distance from the rolls to an outside object, such as the frame of the machine, which is known to be plumb. Again, this method of determining roll alignment is relatively inaccurate and does not provide a positive numerical value of the degree of misalignment. As in the case of the plumb line method, this method is a trial and error system.

The alignment of rolls has also been determined optically by use of a transit. This method provides a precise indication of roll alignment but requires specially skilled operators which are ordinarily not available in the papermaking plant.

SUMMARY OF THE INVENTION

The invention is directed to an improved alignment gauge for use in determining whether two elongated members, such as cylindrical rolls, are in parallel relationship and which will precisely determine the degree of misalignment, if any.

The gauge of the invention includes a rod or standard having a pad which is connected to a micrometer and is mounted for lateral movement with respect to the standard. In addition, a level, having a bubble-containing vial, is mounted for pivotal movement with respect to the standard, and can be pivoted with respect to the standard through an adjusting screw which operates through a worm gear drive.

In operation, one end of the standard is placed tangentially against one of two generally parallel rolls and the pad is positioned tangentially against the other of the rolls. The level is then adjusted or pivoted through the adjusting screw until the bubble in the vial is horizontal or level.

The gauge is then placed in a similar manner against the opposite ends of the rolls and if the axes of the two rolls are in precise alignment or lie in a common plane, the vial will be in a level condition. If, however, the rolls are misaligned, the vial will not be level and the micrometer is then adjusted causing the standard to tilt until the vial is in a level condition. The reading of the micrometer when the vial is level will constitute an indication of the misalignment of the rolls.

The roll aligning gauge of the invention provides a precise reading of misalignment of the rolls which can be used to accurately adjust the misaligned roll to an axial aligned condition.

The gauge is of simple and inexpensive construction and the gauge readings can be made in relatively short periods by operators who require no specialized training.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view showing the roll alignment gauge in position against two generally parallel rolls;

FIG. 2 is a side elevation of the gauge;

FIG. 3 is a top view of the gauge;

FIG. 4 is a section taken along line 4—4 of FIG. 2; and

FIG. 5 is a section taken along line 5—5 of FIG. 2.

DESCRIPTION OF THE ILLUSTRATED EMBODIMENT

FIG. 1 illustrates a roll alignment gauge 1 of the invention as positioned against the corresponding ends of two generally parallel rolls 2 and 3. As illustrated, the two rolls can be the press rolls as used in the press section of a papermaking machine. However, the gauge can be used to determine the alignment of various types of rolls and the rolls can be in contiguous relation or spaced apart, and the rolls can be of the same diameter or have different diameters.

The gauge 1 includes a telescopic rod or standard 4 which includes an upper section 5, a central section 6 and a lower section 7. The three sections 5–7 can be telescoped inwardly to reduce the overall length of the standard 4 and provide a more compact unit for handling and transporting. By extending the sections 6 and 7 the standard can be employed to check the alignment of rolls in which the axes are spaced a substantial distance apart.

The central section 6 is clamped to the upper section 5 by clamp 8 and similarly the lower section 7 is clamped to the central section by a second clamp 8. The clamps 8 are a conventional type including a spring loaded lever arm 9 which is urged inwardly through a hole 10 in the clamp to engage the inner member and prevent relative movement therebetween.

A micrometer 11 is mounted on a plate 12 which is attached to one end of the standard 4. The micrometer is a standard type including a rotatable sleeve 13 which is connected to a pin 14 that extends through aligned openings in the standard 4 and plate 12. The outer end of the pin 14 carries a pad or foot 15 which is adapted to be positioned in a tangential relation to one of the rolls during the gauging procedure.

A level assembly 16 is also mounted on the standard 4 adjacent the micrometer 11. The level assembly 16 includes a pair of side members 17, one of which is formed with a peripheral flange 18 that abuts the other side member to provide a central chamber. The side members 17 are connected together by a series of screws 19, while screws 20 serve to attach the flange 18 to the upper section 5 of standard 4. As best shown in FIG. 4, the side members 17 are provided with aligned openings 21 and a gear ring 22 is mounted for rotation between the members 17 and is aligned with the openings 21. A bubble-containing vial 23 is mounted across the central opening of the gear ring 22, and as illustrated in FIG. 5, the ends of the vial 23 are provided with grooves 24 which engage ribs 25 formed on the inner surface gear ring 22.

To rotate the gear ring 22 and the vial 23 with respect to the side plates 17, the peripheral surface of gear ring 20 is provided with a series of gear teeth 26 which are engaged by a worm 27 mounted on shaft 28 which is journalled in the flange 18 of the side plates 17. The outer end of the shaft 28 carries a knob 29 and by rotating knob 29, the worm 27 will be driven to thereby rotate the gear ring 22 and pivot the vial 23.

In operation, the telescopic sections of the standard 4 are extended to the desired length depending upon the spacing between the axes of the two rolls. The pad is moved to a position through adjustment of the micrometer so that the micrometer reading will be zero, and in normal operation the pad 15 will be up against the standard 4 at the zero reading.

The pad 15 is then placed tangentially against the roll 2, and one of the sections 5–7, depending upon the spacing between the rolls, is placed against the roll 3.

The adjusting knob 29 is then rotated to pivot the vial 23 until it is level, as shown by the horizontal position of the bubble. When the vial is leveled, the gauge is removed from the rolls and positioned in a similar manner at the opposite ends of the rolls 2 and 3. If the rolls 2 and 3 are in precise axial alignment, the vial 23 will be in a level condition when the gauge is applied to the opposite ends of the rolls. However, if the vial is not level, the micrometer 11 is then adjusted causing the standard 4 to tilt until the vial 23 reaches a level condition. The micrometer reading, if the standard 4 is vertical, will be a precise indication of misalignment. However, if the two rolls, 2 and 3 are not of the same diameter or are not positioned so that standard 4 is not vertical, the reading of the micrometer will not be the precise distance of misalignment but the distance of the disalignment must be calculated by trigonometric methods.

To aid in the trigonometric calculation, a compass ring or angular scale 30 can be associated with the side plate 17 bordering the central opening. The scale 30 is marked off in degree increments on either side of a zero line, and as illustrated it is marked off from 0° to 90°, and the rotatable vial 23 is provided with a reference mark 31. After final adjustment, the reading of reference mark 31 on scale 30 will indicate the angular position of the standard and the angular reading, in conjunction with the micrometer reading, can be used to calculate the precise distance of misalignment.

To provide accurate readings, the standard 4, when applied tantentially to the rolls, should lie in a plane perpendicular or orthogonal to the axes of the rolls 2 and 3. To determine whether the standard 4 lies in a plane perpendicular to the axes of the rolls, a second bubble-containing vial 32 is mounted transversely on the assembly 16 and if the bubble is centered within vial 32, the standard 4 will be in a plane perpendicular to the axes of the rolls.

If, when the gauge 1 is moved to the opposite ends of the rolls, the vial in the gear is not level and requires a movement of the pad 15 toward the standard for leveling, which is not possible, the procedure is then reversed with the first reading of the gauge taken at the opposite ends of the rolls and the second reading taken at the original position.

The roll alignment gauge of the invention is a simple and inexpensive device which provides an accurate determination of axial misalignment of rolls. The gauging operation can be carried out by unskilled operators and requires substantially less time than conventional alignment gauges, thereby enabling the alignment to be checked more frequently.

While the above decription has illustrated the invention being used to determine the alignment of two cylindrical rolls, it is contemplated that the gauge can be used to determine the alignment of any elongated members. For example, in a papermaking machine, the gauge can be used to check the alignment of the slice lip of the head box with the breast roll, or to check the alignment of a press roll with a cross-machine structural members.

Various modes of carrying out the invention are contemplated as being within the scope of the following claims particularly pointing out and distinctly claiming the subject matter which is regarded as the invention.

I claim:

1. A method of determining the axial alignment of a pair of elongated cylindrical members, comprising the steps of providing a standard having a laterally adjustable member-engaging element and having a level mounted for pivotal movement with respect to the standard, placing the standard against the corresponding first ends of the elongated members with a first portion of the standard disposed against the side of a first of said members and said element disposed against the side of the second of said members, pivoting the level with respect to the standard until the level is leveled, placing the standard against the corresponding opposite ends of said members with said first portion disposed against the side of the first member and the element disposed against the side of the second member, and adjusting the lateral position of the element with respect to the standard until the level is leveled, the amount of lateral adjustment of the element constituting an indication of the parallel misalignment of the members.

2. The method of claim 1, and including the step of measuring the amount of lateral adjustment of the element.

3. The method of claim 1, and including the steps of positioning the standard when placed against the corresponding first ends of said members so that it lies in a plane perpendicular to the longitudinal axes of said members, and positioning the standard when placed against the corresponding opposite ends of said members so that it lies in a plane perpendicular to the longitudinal axes of said members.

* * * * *